(12) United States Patent
Doll

(10) Patent No.: US 7,411,785 B2
(45) Date of Patent: Aug. 12, 2008

(54) HEAT-SPREADING DEVICES FOR COOLING COMPUTER SYSTEMS AND ASSOCIATED METHODS OF USE

(75) Inventor: Wade J. Doll, Seattle, WA (US)

(73) Assignee: Cray Inc., Seattle, WA (US)

( * ) Notice: Subject to any disclaimer, the term of this patent is extended or adjusted under 35 U.S.C. 154(b) by 306 days.

(21) Appl. No.: 11/447,469

(22) Filed: Jun. 5, 2006

(65) Prior Publication Data

US 2007/0279861 A1    Dec. 6, 2007

(51) Int. Cl.
*G06F 1/16* (2006.01)

(52) U.S. Cl. .................. 361/687; 361/695; 62/259.2; 29/890; 165/104.34

(58) Field of Classification Search .................. 62/485, 62/259.2, 119, 80.4; 165/908, 104.34, 122, 165/299–300; 29/890, 464; 361/690–699, 361/679–687, 724–727
See application file for complete search history.

(56) References Cited

U.S. PATENT DOCUMENTS

| | | | |
|---|---|---|---|
| 3,317,798 | A | 5/1967 | Chu et al. |
| 4,315,300 | A | 2/1982 | Parmerlee et al. |
| 4,874,127 | A | 10/1989 | Collier |
| 5,035,628 | A | 7/1991 | Casciotti et al. |
| 5,060,716 | A | 10/1991 | Heine |
| 5,150,277 | A | 9/1992 | Bainbridge et al. |
| 5,161,087 | A | 11/1992 | Frankeny et al. |
| 5,273,438 | A | 12/1993 | Bradley |
| 5,323,847 | A | 6/1994 | Koizumi et al. |
| 5,329,425 | A | 7/1994 | Leyssens et al. |
| 5,339,214 | A | 8/1994 | Nelson |
| 5,345,779 | A | 9/1994 | Feeney |
| 5,365,402 | A | 11/1994 | Hatada et al. |
| 5,376,008 | A | 12/1994 | Rodriguez |
| 5,395,251 | A | 3/1995 | Rodriguez et al. |
| 5,402,313 | A | 3/1995 | Casperson et al. |
| 5,410,448 | A | 4/1995 | Barker, III et al. |

(Continued)

FOREIGN PATENT DOCUMENTS

JP    2004-79754    8/2002

(Continued)

OTHER PUBLICATIONS

U.S. Appl. No. 10/904,889, filed Dec. 2, 2004, Borror.

(Continued)

*Primary Examiner*—Hung V Duong
(74) *Attorney, Agent, or Firm*—Perkins Coie LLP

(57) ABSTRACT

Cooling systems for use with computer systems are disclosed herein. In one embodiment, a computer system includes a first computer module spaced apart from a second computer module to define a space therebetween. The computer system further includes a cooling system positioned in the space between the first and second computer modules. The cooling system includes a first heat exchanging portion containing a working fluid that absorbs heat from an electronic device mounted to the first computer module. The cooling system further includes a second heat exchanging portion that receives the heated working fluid from the first heat exchanging portion to cool the heated working fluid. A fluid mover is operably coupled to the first and second heat exchanging portions to circulate the working fluid through the first and second heat exchanging portions.

40 Claims, 6 Drawing Sheets

U.S. PATENT DOCUMENTS

| | | | |
|---|---|---|---|
| 5,572,403 A * | 11/1996 | Mills | 361/695 |
| 5,603,375 A | 2/1997 | Salt et al. | |
| 5,718,628 A | 2/1998 | Nakazato et al. | |
| 6,046,908 A | 4/2000 | Feng | |
| 6,115,242 A | 9/2000 | Lambrecht | |
| 6,158,502 A | 12/2000 | Thomas | |
| 6,167,948 B1 | 1/2001 | Thomas | |
| 6,185,098 B1 | 2/2001 | Benavides | |
| 6,310,773 B1 | 10/2001 | Yusuf et al. | |
| 6,416,330 B1 | 7/2002 | Yatskov | |
| 6,435,266 B1 | 8/2002 | Wu | |
| 6,515,862 B1 | 2/2003 | Wong et al. | |
| 6,519,955 B2 | 2/2003 | Marsala | |
| 6,550,530 B1 | 4/2003 | Bilski | |
| 6,557,357 B2 | 5/2003 | Spinazzola et al. | |
| 6,564,858 B1 | 5/2003 | Stahl | |
| 6,644,384 B2 | 11/2003 | Stahl | |
| 6,661,660 B2 | 12/2003 | Prasher et al. | |
| 6,679,081 B2 | 1/2004 | Marsala | |
| 6,772,604 B2 | 8/2004 | Bash et al. | |
| 6,776,707 B2 | 8/2004 | Koplin | |
| 6,904,968 B2 | 6/2005 | Beitelmal et al. | |
| 6,914,780 B1 | 7/2005 | Shanker et al. | |
| 6,992,889 B1 | 1/2006 | Kashiwagi et al. | |
| 6,999,316 B2 | 2/2006 | Hamman | |
| 7,051,946 B2 | 5/2006 | Bash et al. | |
| 7,120,027 B2 | 10/2006 | Yatskov et al. | |
| 7,177,156 B2 | 2/2007 | Yatskov et al. | |
| 7,193,851 B2 | 3/2007 | Yatskov | |
| 2001/0052412 A1 | 12/2001 | Tikka | |
| 2002/0172007 A1 * | 11/2002 | Pautsch | 361/690 |
| 2002/0181200 A1 | 12/2002 | Chang | |
| 2003/0010477 A1 | 1/2003 | Khrustalev et al. | |
| 2003/0056941 A1 | 3/2003 | Lai et al. | |
| 2004/0008491 A1 | 1/2004 | Chen | |
| 2004/0052052 A1 | 3/2004 | Rivera | |
| 2004/0250990 A1 | 12/2004 | Schaper | |
| 2005/0120737 A1 | 6/2005 | Borror et al. | |
| 2005/0162834 A1 | 7/2005 | Nishimura | |
| 2005/0168945 A1 | 8/2005 | Coglitore | |
| 2005/0225936 A1 | 10/2005 | Day | |
| 2006/0018094 A1 | 1/2006 | Robbins et al. | |
| 2006/0102322 A1 | 5/2006 | Madara et al. | |
| 2008/0078202 A1* | 4/2008 | Luo | 62/485 |
| 2008/0092387 A1* | 4/2008 | Campbell et al. | 29/890.03 |

FOREIGN PATENT DOCUMENTS

| | | |
|---|---|---|
| WO | WO-01/86217 A1 | 11/2001 |
| WO | WO-2005/027609 | 3/2005 |

OTHER PUBLICATIONS

U.S. Appl. No. 10/805,875, filed Mar. 22, 2004, Yatskov.

"Frequently Asked Questions about Heat Pipes," Thermacore International, Inc., http://www.thermacore.com/hpt_faqs.htm, 3 pages [accessed Jun. 14, 2004].

Hannemann, Robert et al., "Pumped Liquid Multiphase Cooling," ASME, 2004, IMECE 2004, Paper IMECE2004-60669, Anaheim, CA, 5 pages.

"Managing Extreme Heat Cooling Strategies for High-Density Computer Systems," Liebert Corporation, Dec. 7, 2003, Columbus, OH, 16 pages.

"Thermal Form & Function—Rack Cooling System (RCS)," Thermal Form & Function LLC, 2005, Manchester, MA, one page, http:/www.thermalformandfunction.com/racksystem.html, [accessed May 11, 2006].

Vogel, Marlin et al., "Low Profile Heat Sink Cooling Technologies for Next Generation CPU Thermal Designs," *Electronic Cooling Online*, Feb. 17, 2005, 11 pages.

"Therma-base™ Heat Sink," Thermacore Thermal Management Solutions, pp. 1-3, [accessed Jun. 14, 2005].

Pitasi, M. "Thermal Management System Using Pumped Liquid R-134a with Two Phase Heat Transfer," Thermal Form & Function LLC, Manchester, MA, Mar. 2002, pp. 1-9, http:/www.coolingzone.com/Guest/News/NL_MAR_2002/TFF/Tff.html.

Marsala, Joe, "Pumped Liquid/Two Phase Cooling for High Performance Systems," Thermal Form & Function LLC, May 13, 2003, Scottsdale, AZ, 19 pages.

Webb, Warren, "Take the heat: Cool that hot embedded design," *EDN*, May 13, 2004, 5 pages.

Novel Concepts, Inc., "Heat Spreaders," http://www.novelconceptsinc.com/heat-spreaders.htm, 2 pages [accessed Jun. 14, 2004].

JAMSTEC/Earth Simulator Center, "Processor Node (PN) Cabinet," http://www.es.jamstec.go.jp/esc/eng/Hardware/pnc.html, 1 page [accessed May 5, 2004].

U.S. Appl. No. 11/164,187, filed Nov. 14, 2005, Madara et al.

Baer, D.B., "Emerging Cooling Requirements & Systems in Telecommunications Spaces," Telecommunications Energy Conference 2001, Oct. 14-18, 2001, pp. 95-100.

Thermal Form & Function LLC, "Box/Blade Cooling System," Manchester, MA, 2005, 1 page http://www.thermalformandfunction.com/boxsystem.html [accessed May 10, 2006].

* cited by examiner

HEAT-SPREADING DEVICES FOR COOLING COMPUTER SYSTEMS AND ASSOCIATED METHODS OF USE

TECHNICAL FIELD

The following disclosure relates generally to cooling systems for use with computer systems.

BACKGROUND

Supercomputers and other large computer systems typically include a large number of computer cabinets arranged in close proximity to each other. FIG. 1, for example, illustrates a portion of a prior art supercomputer system 100 having a plurality of computer cabinets 110 arranged in a bank. The computer cabinets 110 are arranged in a bank to conserve floor space and increase computational speed by reducing cable lengths between cabinets. Each of the computer cabinets 110 includes a plurality of computer module compartments 118 (identified individually as a first module compartment 118a, a second module compartment 118b, and a third module compartment 118c). Each module compartment 118 holds a plurality of computer modules 112. Each computer module 112 can include a motherboard electrically connecting a plurality of processors, memory modules, routers, and other microelectronic devices together for data and/or power transmission. Like the computer cabinets 110, the computer modules 112 are also positioned in close proximity to each other to conserve space and increase computational speed.

Many of the electronic devices typically found in supercomputers, such as fast processing devices, can generate considerable heat during operation. This heat can damage the device and/or degrade performance if not dissipated during operation. To dissipate this heat and maintain device temperatures at acceptable levels, the prior art supercomputer system 100 further includes a plurality of fans 120 mounted to upper portions of corresponding computer cabinets 110. In operation, each of the fans 120 draws cooling air into the corresponding computer cabinet 110 through a front inlet 114 and/or a back inlet 115 positioned toward a bottom portion of the computer cabinet 110. The cooling air flows upwardly through the computer cabinet 110, past the computer modules 112, and into the fan 120. The cooling air then flows out of the fan 120 and into the surrounding room.

One problem associated with the prior art supercomputer system 100 is the uneven distribution of heat in the computer cabinet 110. For example, the different computer modules 112 typically carry different arrangements of electronic devices depending on the particular application. The different devices can operate at different temperatures due to their varying power consumption. As a result, as the cooling air flows past the computer modules 112, high-power devices transfer more heat to the cooling air than low-power devices. The uneven heat transfer causes the cooling air to have uneven temperature profiles in the computer cabinet 110. As a consequence, the high temperature cooling air may not sufficiently cool some of the electronic devices due to its reduced heat capacitance.

One example of a conventional technique for improving cooling in a computer system uses a re-circulating water cooling system. FIG. 2, for example, illustrates a prior art computer system 230 having a water-cooled processing device 232. In the illustrated example, some external panels of the computer system 230 have been removed for clarity. The computer system 230 includes a computer module 236 (e.g., a motherboard) mounted in a housing 234 having a grill 235. The processing device 232 is mounted to the computer module 236. The computer system 230 further includes a heat exchanger 238 mounted on top of the processing device 232, a radiator 240 positioned proximate to the grill 235, a fan 244 positioned proximate to the radiator 240, and a circulating pump 241. The computer system 230 can optionally include a reservoir (not shown). The heat exchanger 238 is connected to the radiator 240 via out and return water lines 242a and 242b, respectively.

In operation, heat flows from the processing device 232 into the water circulating through the heat exchanger 238. The pump 241 moves the heated water from the heat exchanger 238 to the radiator 240. The fan 244 moves cooling air through the radiator 240 to cool the heated water. The pump 241 then re-circulates the cooled water back to the heat exchanger 238 via the water line 242a in a continuous cooling cycle.

There are a number of shortcomings associated with the re-circulating type water cooling system described above. For example, the heat exchanger 238 and the radiator 240 occupy a considerable amount of space in the housing 234. As a result, the housing 234 might not be able to accommodate additional processing devices if desired. Furthermore, the heat exchanger/radiator combination does not address the problem of uneven heat distribution. Consequently, some locations in the housing 234 might be at higher temperatures than others because of the arrangement of different heat-generating devices (e.g., video cards or memory chips) on the computer module 236.

DETAILED DESCRIPTION

Figure 1:
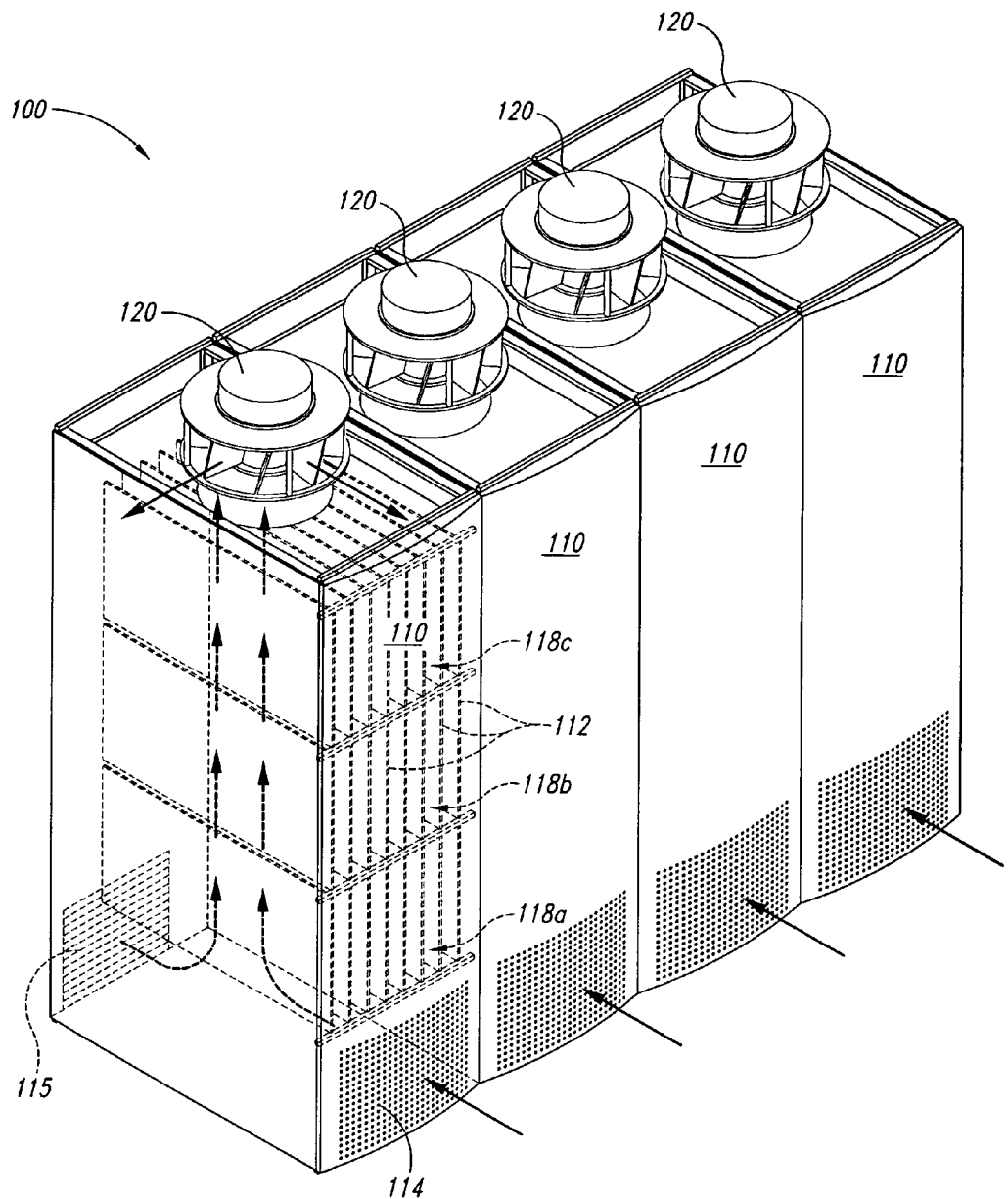
FIG. 1 is an isometric view of a bank of computer cabinets having cooling systems configured in accordance with the prior art.
Figure 2:
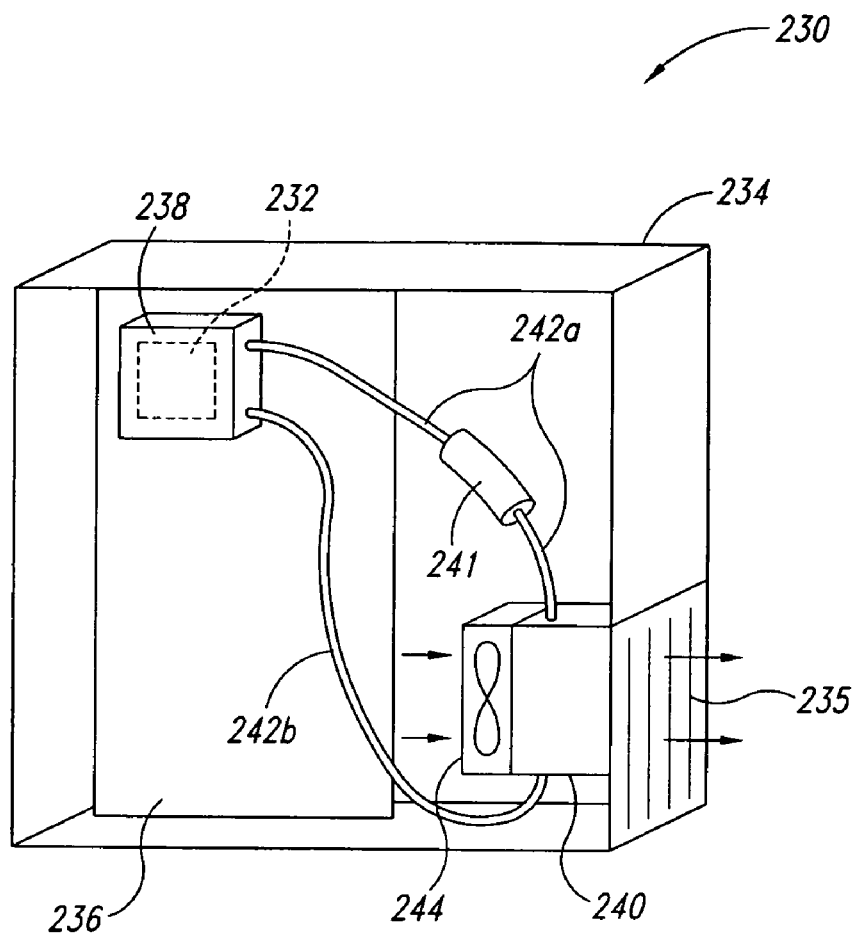
FIG. 2 is an isometric view of a computer system having a re-circulating water cooling system configured in accordance with the prior art.

The following disclosure describes several embodiments of cooling systems for use with computers and other systems. One aspect of the invention is directed toward a computer system having a first computer module spaced apart from a second computer module to define a space therebetween. The first computer module carries an electronic device. The computer system further includes a cooling system positioned in the space between the first and second computer modules. The cooling system can include a first heat exchanging portion containing a working fluid that absorbs heat from the electronic device. The cooling system can further include a second heat exchanging portion that receives the heated working fluid from the first heat exchanging portion to cool the heated working fluid. In one embodiment, a fluid mover is operably coupled to the first and second heat exchanging portions to circulate the working fluid through the first and second heat exchanging portions.

Another aspect of the invention is directed toward a computer module assembly positioned in a cabinet. The computer module assembly includes an electronic device mounted to a substrate. The computer module assembly further includes a cooling system having a first heat exchanging portion positioned at least proximate to the electronic device and containing a working fluid that absorbs heat from the electronic device. The cooling system further includes a second heat exchanging portion positioned in an air flow path in the cabinet. The second heat exchanging portion receives the heated working fluid from the first heat exchanging portion to cool the heated working fluid in the air flow path. In one embodiment, a fluid mover is operably coupled to the first and second heat exchanging portions to circulate the working fluid through the first and second heat exchanging portions.

A further aspect of the invention is directed toward a method for cooling an electronic device mounted to a first computer module in a cabinet. The method includes positioning a first heat exchanger proximate to the electronic device and a second heat exchanger in the space between the first computer module and a second computer module. The method further includes moving a working fluid through the first heat exchanger to absorb heat from the electronic device, and then moving the working fluid through the second heat exchanger to transfer heat from the working fluid to air flowing past the second heat exchanger.

Specific details of several embodiments of the invention are described below with reference to FIGS. 3-7 to provide a thorough understanding of the embodiments. Other details describing well-known structures and systems often associated with computer cabinets and associated air conditioning systems, however, are not set forth below to avoid obscuring the description of the various embodiments. Those of ordinary skill in the art will understand that the invention may have other embodiments in addition to those described below. Such embodiments may lack one or more of the elements described below. Alternatively, such embodiments may include other elements in addition to those described below.

In the Figures, identical reference numbers identify identical or at least generally similar elements. To facilitate the discussion of any particular element, the most significant digit or digits of any reference number refer to the Figure in which that element is first introduced. Element 300, for example, is first introduced and discussed with reference to FIG. 3.

Figure 3:
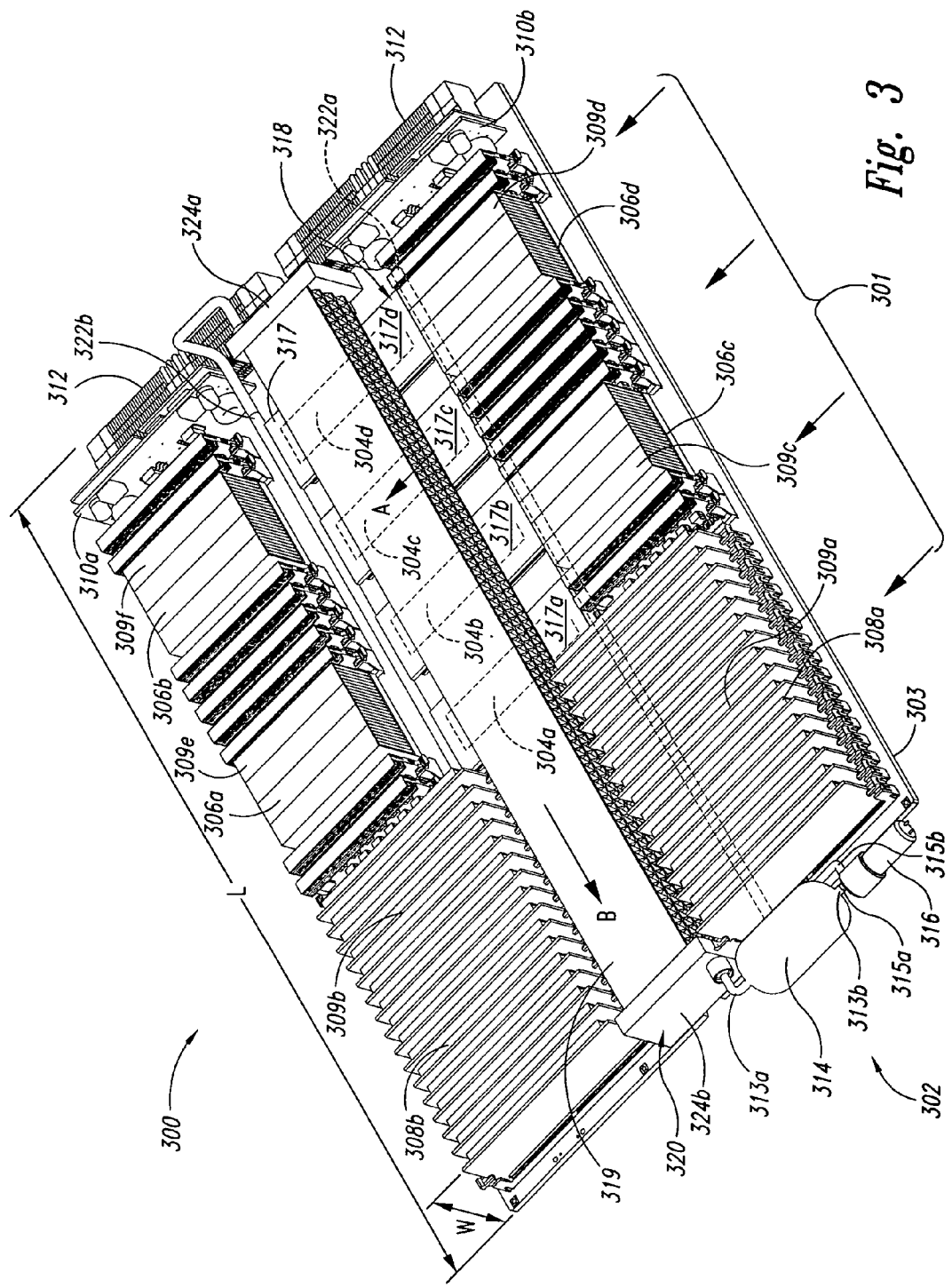
FIG. 3 is an isometric view of a computer module having a cooling system configured in accordance with an embodiment of the invention.

FIG. 3 is an isometric view of a computer module 300 having a cooling system 302 configured in accordance with an embodiment of the invention. In one aspect of this embodiment, the computer module 300 can be installed in a computer cabinet at least generally similar in structure and function to the computer cabinet 110 of FIG. 1. In other embodiments, the computer module 300 and/or the cooling system 302 can be used in or with other types of systems.

The computer module 300 can include a substrate 303 (e.g., a motherboard) carrying various types of electronic devices including, for example, high-power processing devices 304 (identified individually as processing devices 304a-d), low-power processing devices 306 (identified individually as processing devices 306a-d), memory devices 308 (identified individually as memory devices 308a-b), other devices (identified individually as other devices 310a and 310b, e.g., modems, soundcards, etc.), and terminal blocks 312. The high-power processing devices 304 can include, for example, high speed processors and/or other types of processors. The low-power processing devices 306 can include, for example, signal processors, A/D converters, transmitters, etc. The memory devices 308 can include, for example, DRAM, SRAM, or other types of volatile or non-volatile memory devices. In the illustrated embodiment, the processing devices 304 and 306 are positioned toward one end of the substrate 303, and the memory devices 308 are positioned toward the other end of the substrate 303. In other embodiments, the various devices on the substrate 303 can have other arrangements.

In one aspect of this embodiment, each of the low-power processing devices 306 and each of the memory devices 308 can include a plurality of corresponding fins 309 (identified as fins 309a-f) for dissipating heat. The fins 309a, for example, project outwardly from the memory device 308a and into a flow of cooling air. The fins 309a absorb heat generated by the memory device 308a during operation via conduction and transfer the heat to the cooling air 301. The fins 309 can be constructed from any suitable material known in the art including, for example, aluminum, copper, steel, iron, and/or any other suitable material.

In another aspect of this embodiment, the cooling system 302 is mounted to the substrate 303 for cooling the high-power processing devices 304. The cooling system 302 can include a fluid reservoir 314 connected in series to a fluid mover 316, a first heat exchanging portion 318, and a second heat exchanging portion 320 to form a closed-loop circulation system. The working fluid (not shown) in the cooling system 302 can be a liquid (e.g., water, glycol, aqueous ammonia, etc.), a gas, a two-phase fluid such as, for example, a refrigerant (e.g., R134a), etc.

In the illustrated embodiment, the reservoir 314 includes an inlet 313a, an outlet 313b, and, optionally, a vent (not shown) for relieving internal pressure. The reservoir 314 can be constructed from any suitable material including, for example, aluminum, copper, steel, iron, plastic, glass, and/or any other suitable material known in the art. Although not shown, the reservoir 314 can optionally be insulated with types of material including, for example, alumina, asbestos, glass, cotton, wood, polymers, silica, etc.

The fluid mover 316 can include an inlet 315a connected to the outlet 313b of the reservoir 314, and an outlet 315b connected to the first heat exchanging portion 318. In the illustrated embodiment, the fluid mover 316 can include a pump, such as a positive displacement pump (e.g., Model No. GP-10) manufactured by Mesoscopic Devices LLC, of Broomfield, Colo., or a micro gear pump (e.g., Model No. MZR®-2942) manufactured by HNP Mikrosysteme of Germany. In other embodiments, however, the fluid mover 316 can include other types of devices for moving the working fluid through the cooling system 302. Such devices can include, for example, a blower, a compressor, a fan, etc.

In the illustrated embodiment, the first heat exchanging portion 318 is positioned at least proximate to the high-power processing devices 304 to absorb heat from these devices. The first heat exchanging portion 318 can include a plurality of first heat exchangers 317 (e.g., first heat exchangers 317a-d) arranged in a generally parallel fashion between a first inlet header 322a and a first outlet header 322b. The first inlet header 322a is connected to the outlet 315b of the fluid mover 316 to receive working fluid from the reservoir 314. The first heat exchangers 317 can have any suitable fluid heat exchanger configuration including, for example, a shell-and-tube configuration, a plate-and-frame configuration, a tubeand-fin configuration, and/or a heat conducting passage configuration (e.g., micro-channels). One embodiment of the first heat exchangers 317 is described in more detail below with reference to FIGS. 5 and 6.

The second heat exchanging portion 320 is positioned in the air flow path 301 to distribute the heat flux across the surface of the computer module 300. The second heat exchanging portion 320 can include a second heat exchanger 319 extending between a second inlet header 324a and a second outlet header 324b. The second inlet header 324a is in fluid communication with the first outlet header 322b to receive heated working fluid from the first heat exchanging portion 318. The second outlet header 324b is in fluid communication with the reservoir 314 to transfer cooled working fluid to the reservoir 314. In one embodiment, the second heat exchanging portion 320 can be positioned adjacent to the first heat exchanging portion 318 as shown in FIG. 3. In another embodiment, the second heat exchanging portion 320 can be spaced apart from the first heat exchanging portion 318. In still further embodiments, the first and second heat exchanging portions 318 and 320 can have other configurations and/or other arrangements without departing from the spirit or scope of the present disclosure. As described below in more detail with reference to FIGS. 6 and 7, in one embodiment, the second heat exchanger 319 can have heat conducting passages (e.g., channels, such as micro-channels) arranged side-by-side and separated by fins. In other embodiments, the second heat exchanger 319 can have other heat exchanger configurations, including, for example, circulation coils with or without fins, a plate-and-frame configuration, etc.

In another aspect of this embodiment, the second heat exchanging portion 320 is positioned in the air flow path 301 so that at least a portion of the cooling air flowing past the computer module 300 flows through the second heat exchanging portion 320. In the illustrated embodiment, for example, a substantial portion of the cooling air flows through or across the second heat exchanging portion 320. In other embodiments, however, a smaller portion of the cooling air can flow through or across the second heat exchanging portion 320.

In operation, the fluid mover 316 draws working fluid from the reservoir 314 and moves the working fluid to the first heat exchanging portion 318. The working fluid enters the first heat exchangers 317a-d via the first inlet header 322a and flows across first heat exchangers 317a-d toward the first outlet header 322b (as indicated by arrow A). As the working fluid flows across the first heat exchangers 317a-d, the working fluid absorbs heat from the high-power processing devices 304a-d via, e.g., conduction and/or forced convection. In one embodiment, the working fluid can be a liquid (e.g. refrigerant R134, ammonia, Freon, etc.) that can at least partially vaporize after absorbing heat from the high-power processing devices 304. One advantage of using a partially vaporizing working fluid is that the working fluid can be at a constant temperature, or at an at least approximately constant temperature during heat exchange because the absorbed heat supplies the latent heat of vaporization to the working fluid. In other embodiments, the working fluid can be a vapor (e.g., nitrogen, argon, carbon dioxide, etc.) or a non-vaporizing liquid (e.g., water, oil, etc.) after absorbing heat from the high-power processing devices 304.

The heated working fluid flows from the first heat exchanging portion 318 into the second heat exchanging portion 320 via the second inlet header 324a. The working fluid flows across the second heat exchanger 319 toward the second outlet header 324b (as indicated by arrow B). As the working fluid flows across the second heat exchanger 319, the cooling air 301 flowing through and/or across the second heat exchanger 319 cools the working fluid. In one embodiment, the working fluid can be at least partially vaporized (i.e., a two-phase fluid) at the second inlet header 324a, and can be at least substantially condensed upon reaching the second outlet header 324b. In another embodiment, the working fluid can be sub-cooled at the second outlet header 324b. In a further embodiment, the working fluid can be a two-phase fluid at the second inlet header 324a and the second outlet header 324b, and the reservoir 314 can separate the working fluid into a liquid phase and a vapor phase. In all these embodiments, the cooled working fluid returns to the reservoir 314 and the fluid mover 316 re-circulates at least a portion of the working fluid in the manner described above in a continuous cooling cycle.

There are a number of advantages associated with the embodiments of the cooling system 302 described above. One advantage is that the cooling system 302 can achieve more efficient heat dissipation from the high-power processing devices 302 than simple air cooling because the second heat exchanging portion 320 provides additional heat transfer area. Another advantage is that the second heat exchanging portion 320 can spread heat flux length-wise and width-wise across the air flow path 301. Without being bound by theory, in one embodiment, it is believed that the heat flux can be at least approximately constant across substantially the entire length L of the computer module 300 when the working fluid is partially vaporized in the second heat exchanging portion 320. As is known, heat flux (Q) is proportional to flow rate (F), heat capacity (Cp), and temperature differential (ΔT) between a hot stream and a cold stream as shown in the following formula:

$$Q = F \times Cp \times \Delta T$$

The hot stream in this example (i.e., the working fluid) is at an at least approximately constant temperature because the working fluid is, in this embodiment, a two-phase fluid. Thus, as the working fluid flows across the second heat exchanging portion 320, an at least approximately constant temperature differential between the working fluid and the cooling air is believed to be achieved along the length L and the width W of the space. As a result, the heat flux is at least approximately evenly distributed along the length L and the width W. Consequently, the flow of cooling air can have a substantially even temperature profile after flowing through the second heat exchanging portion 320. In other embodiments, however, the methods and systems disclosed herein can be used in different ways to achieve different results.

Although the illustrated embodiment shows a closed-loop arrangement, in other embodiments, the cooling system 302 can have an open-loop arrangement or a closed-loop arrangement with purging. For example, in another embodiment, the cooling system 302 can include a purge port and a make-up port (not shown) at suitable locations along the circulation loop. The working fluid can be purged from the cooling system 302 via the purge port and replenished via the make-up port at substantially the same rate. In another embodiment, the cooling system 302 can include additional devices including, for example, filtration devices (e.g., filters, strainers, etc.), sensors (e.g., pressure and temperature transmitters, gauges, etc.), valves (e.g., block valves, pressure relief valves, control valves, etc.), and other suitable devices. Accordingly, the present invention is not limited to the particular closed-loop cooling arrangement shown in FIG. 3, but extends to other closed and/or open loop-type configurations.

Although the illustrated embodiment shows the first heat exchanging portions 318 positioned adjacent and/or proximate to corresponding high-power processing devices 304, in other embodiments, the first heat exchanging portions 318 can be positioned at least proximate to the high-power processing devices 304 and the low-power processing devices 306, or proximate to all the electronic devices carried by the computer module 300. Accordingly, the present invention is not limited to positioning the first heat exchanging portion 318 proximate to the high-power processing devices 304 in the particular arrangement of FIG. 3, but extends to positioning the first heat exchanging portion 318 proximate to other electronic devices on the substrate 303 as desired to provide suitable cooling.

Figure 4:
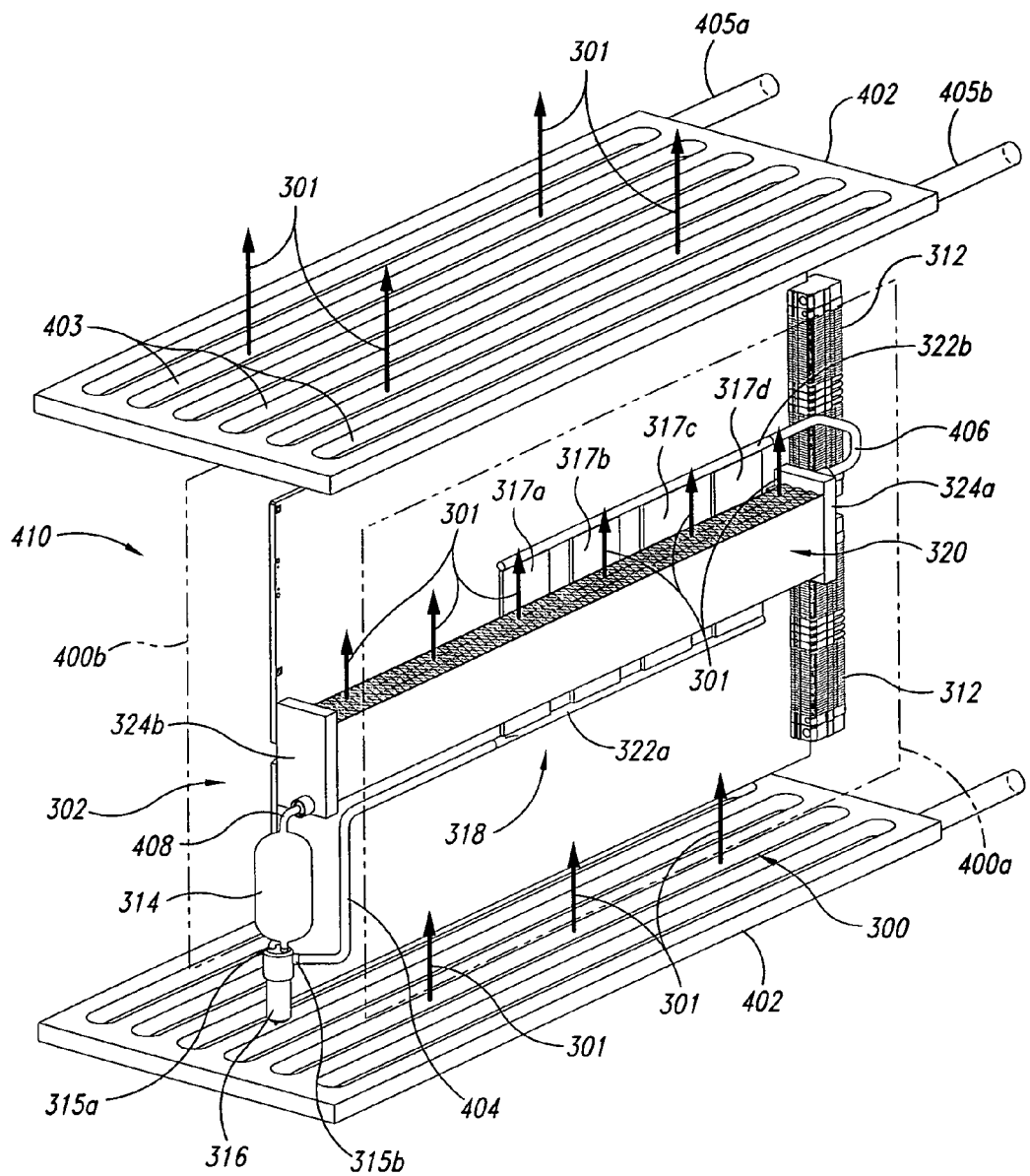
FIG. 4 is an isometric view of the computer module of FIG. 3, illustrating features of the cooling system in more detail.

FIG. 4 is an isometric view of the computer module 300 of FIG. 3 positioned in a computer cabinet 410 (e.g., a computer cabinet at least generally similar in structure and function to the computer cabinet 110 of FIG. 1), in accordance with an embodiment of the invention. In the illustrated embodiment, some electronic devices have been removed from the computer module 300 for clarity. Also, adjacent computer modules 400a, b are shown in phantom lines to illustrate the spatial relationship between the computer modules in the computer cabinet 410. In this embodiment, a first conduit 404 connects the fluid mover 316 to the first inlet header 322a of the first heat exchanging portion 304. A second conduit 406 connects the first outlet header 322b to the second inlet header 324a. A third conduit 408 connects the second outlet header 324b of the second heat exchanging portion 320 to the reservoir 314. The conduits 404, 406, and 408 can include any suitable fluid transporting devices including, for example, pipes, tubing, fittings, etc. constructed from any suitable material including, for example, stainless steel, copper, plastic, aluminum, fiberglass, etc.

In one aspect of this embodiment, multiple computer modules 300 are positioned side-by-side and separated by a space between each pair. The space can have a length L approximately equal to the length of the substrate 303 and a width W approximately equal to the distance between the adjacent computer modules. In the cabinet configuration of FIG. 4, as a fan (not shown) draws a flow of cooling air through the computer cabinet 410, this space defines the air flow path for the cooling air flowing past the computer modules 300. In the illustrated embodiment, the second heat exchanging portion 320 is sized and configured to span substantially the entire length L and width W of the air flow path 301. In other embodiments, the second heat exchanging portion 320 can be sized and configured to span only a portion of the length L and/or width W of the air flow path 301.

In another aspect of this embodiment, the computer cabinet 410 can optionally include air coolers or intercoolers 402 (identified individually as 402a and 402b) positioned proximate to (e.g., above and/or below) the computer module 300 in the air flow path 301. The air coolers 402 are shown schematically in FIG. 4, and can be configured to circulate a coolant (not shown) received from an external heat removal system (also not shown) via inlet 405a. After circulating through the air coolers 402, the coolant returns to the heat removal system for heat dissipation via outlet 405b. In the illustrated embodiment, the air coolers 402 can include a plurality of cooling fins 403 extending between an inlet manifold and an outlet manifold (not shown) as described in more detail in U.S. patent application Ser. No. 10/805,875, which is incorporated herein in its entirety by reference. In other embodiments, the air coolers 402 can have other heat exchanging configurations including, for example, a shell-and-tube configuration, a plate-and-frame configuration, or other types of suitable heat exchanging configuration. In still further embodiments, the air cooler 402 can be omitted.

In operation, the flow of cooling air in the air flow path 301 absorbs heat from the working fluid flowing through the second heat exchanging portion 320. The heated cooling air then passes through the second air cooler 402b. The coolant circulating through the second air cooler 402b absorbs heat from the cooling air and reduces the corresponding air temperature. The cooled air can then flow into an adjacent (e.g., "upstream") module compartment and past additional computer modules positioned in the computer cabinet 410.

One advantage associated with the embodiment of the cooling system 302 described above is the increased efficiency of heat transfer between the cooling air and the second air cooler 402b. For example, after passing through the second heat exchanging portion 320, the cooling air has an at least approximately even temperature profile along the length L of the computer module 300. As a result, the heat flux flowing from the cooling air to the second air cooler 402b is at least substantially constant along the length L of the computer module 300. The substantially constant heat flux can reduce inconsistent heat transfer and undesirable bypass between the cooling air and the coolant in the second air cooler 402b, and thus improve overall cooling efficiency in the computer cabinet 410.

In the illustrated embodiment, the air coolers 402 span across at least a substantial portion of the entire computer module compartment of the computer cabinet 410. In other embodiments, the air coolers 402 can have other sizes, or can be omitted. In still further embodiments, more or fewer air coolers, computer modules, etc., can be used. Accordingly, the present invention is not limited to the particular air cooler/computer module arrangement shown in FIG. 4.

Figure 5:
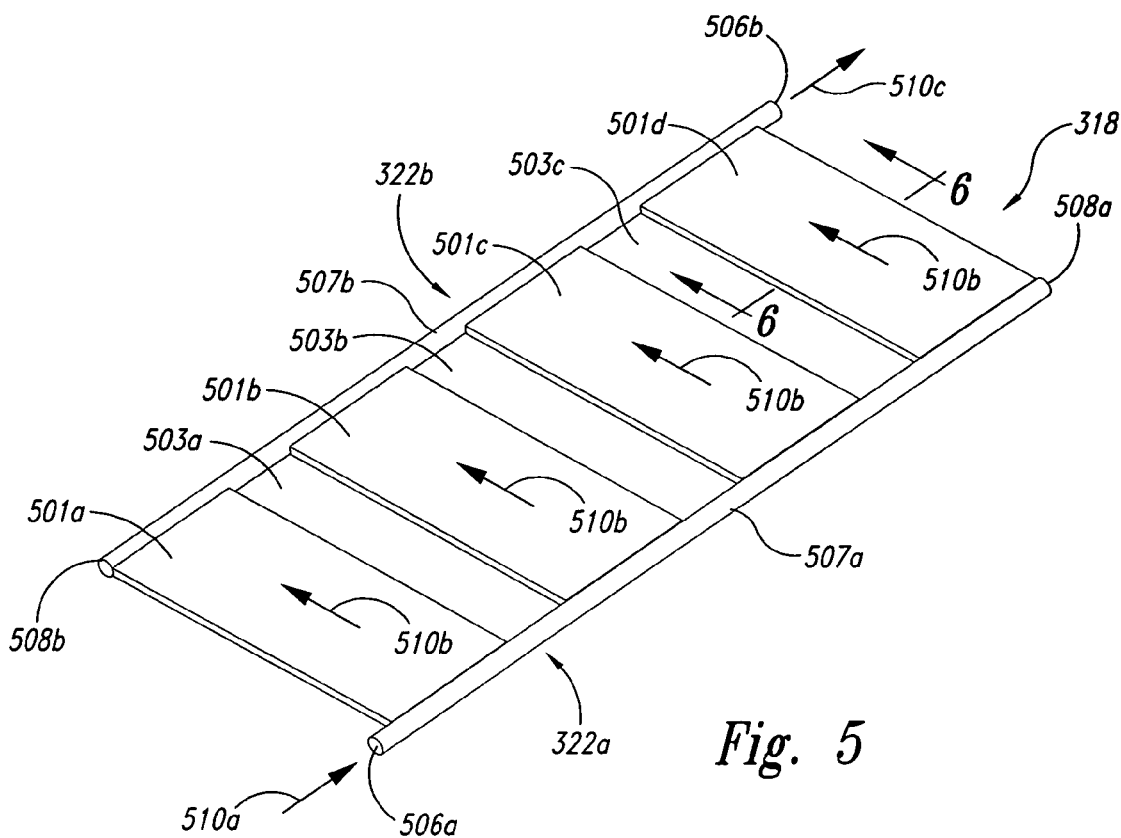
FIG. 5 is an enlarged isometric view of a heat exchanging portion of the cooling system of FIGS. 3 and 4, configured in accordance with an embodiment of the invention.

FIG. 5 is an enlarged isometric view of the first heat exchanging portion 318 of FIGS. 3 and 4, configured in accordance with an embodiment of the invention. In the illustrated embodiment, the first heat exchanging portion 318 includes a plurality of passage portions 501 (identified individually as passage portions 501a-d) spaced apart from each other by a plurality of corresponding gaps 503a-c. The passage portions 501 extend between the first inlet header 322a and the first outlet header 322b. The first inlet header 322a includes a first tubular section 507a having a first inlet port 506a and a first capped end 508a. The first outlet header 322b includes a second tubular section 507b having a first outlet port 506b and a second capped end 508b. The first inlet header 322a and the first outlet header 322b can be constructed from any suitable material including, for example, copper, aluminum, stainless steel, and/or other materials having sufficient mechanical strength, etc. Optionally, the first inlet header 322a and the first outlet header 322b can include flow patterning devices including, for example, orifices, baffles, static mixers, etc.

In one aspect of this embodiment, each of the passage portions 501 can include a generally flat plate having one or more internal channels (e.g., micro-channels, not shown) through which working fluid flows. The channels can have any suitable configuration including, for example, straight-through, serpentine, and/or any other desired configuration. One embodiment of the passage portions 501 includes micro-channels having internal corrugated fins as described in more detail below with reference to FIG. 6.

In operation, the working fluid (represented by arrow 510a) enters the first inlet header 322a via the first inlet port 506a. The first inlet header 322a distributes the working fluid to each of the passage portions 501a-d. The working fluid (represented by arrows 510b) then flows through the passage portions 501a-d to reach the first outlet header 322b. While flowing through the passage portions 501, the working fluid absorbs heat from heat sources (e.g., the high-power processing devices 304) positioned proximate to the passage portions 501. The heated working fluid then flows into the first outlet header 322b and is discharged (represented by arrow 510c) via the first outlet port 506b.

Figure 6:
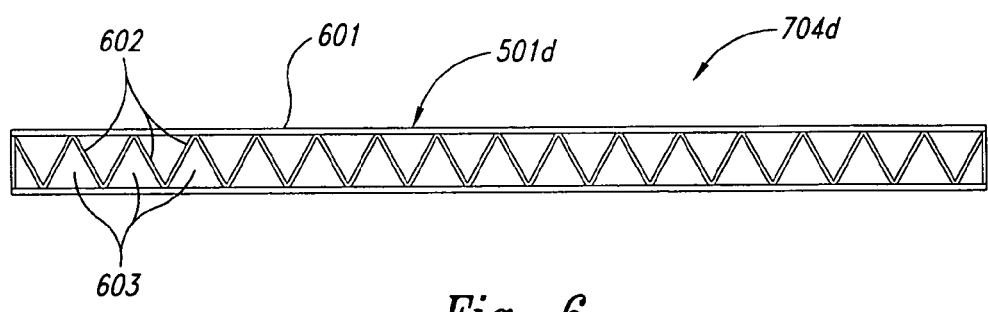
FIG. 6 is a cross-sectional view taken along lines 6-6 in FIGS. 5 and 7, illustrating a passage assembly configured in accordance with an embodiment of the invention.

FIGS. 6 is a cross-sectional view taken along lines 6-6 in FIG. 5 of the passage portion 501d, configured in accordance with an embodiment of the invention. In one aspect of this embodiment, the passage portion 501d can include an outer shell 601 enclosing a plurality of internal dividers 602. The dividers 602 can be arranged in a corrugated fashion to form a plurality of channels 603 for fluid transfer. Although the illustrated embodiment shows corrugated dividers 602 in a saw-tooth arrangement, in other embodiments, the separator 602 can have other arrangements including, for example, straight vertical, straight horizontal, sinusoidal arrangements, etc. The passage portions 501d and 704d can be constructed from any suitable material including, for example, copper, aluminum, stainless steel, or any other material having sufficient mechanical strength and/or thermal conductivity. The passage portions 501d and 704d can be constructed using a variety of suitable manufacturing methods, such as brazing, welding, bonding, fastening, etc.

Figure 7:
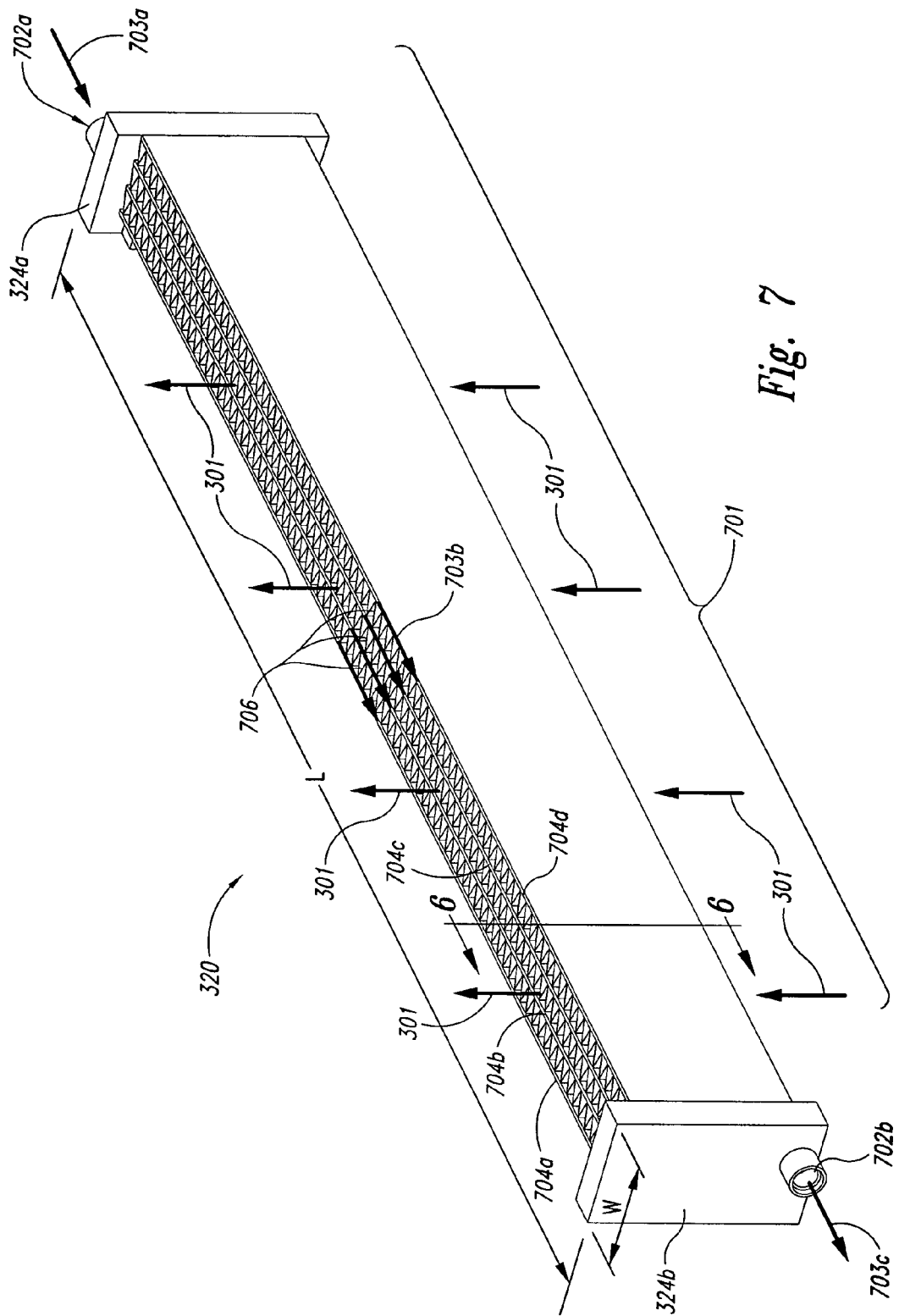
FIG. 7 is an enlarged isometric view of another heat exchanging portion of the cooling system of FIGS. 3 and 4, configured in accordance with an embodiment of the invention.

FIG. 7 is an enlarged isometric view of the second heat exchanging portion 320 of FIGS. 3 and 4, configured in accordance with an embodiment of the invention. In the illustrated embodiment, the second heat exchanging portion 320 includes a plurality of spaced-apart passage portions 704 (identified individually as passage portions 704a-d) extending between the second inlet header 324a and the second outlet header 324b. The second inlet header 324a includes a second inlet port 702a configured to receive the heated working fluid (represented by arrow 703a) from the first outlet header 322b of the first heat exchanging portion 318 (FIG. 5). The second outlet header 324b includes a second outlet port 702b configured to discharge the cooled working fluid (represented by arrow 703c) from the passage portions 704 to the reservoir 314 (FIG. 4). In the illustrated embodiment, the second inlet header 324a and the second outlet header 324b can be generally rectangular vessels constructed from any suitable material including, for example, copper, aluminum, stainless steel, or any other material with sufficient mechanical strength, and using a variety of suitable manufacturing methods. Optionally, the second inlet header 324a and/or the second outlet header 324b can include flow patterning devices including, for example, orifices, baffles, static mixers, etc.

In another aspect of the invention, the second heat exchanging portion 320 includes a plurality of fins 706 separating adjacent passage portions 704. In one embodiment, the fins 706 can be corrugated to form air flow passages for the cooling air to flow past the computer module 300 (FIG. 4). In other embodiments, the fins 706 can be eliminated, and the passage portions 704 can be separated by spacers. In a further embodiment, the space between the passage portions 704 can be entirely open. The passage portions 704 can be similar in structure and function to the passage portions 501 of the first heat exchangers 317 described above with reference to FIG. 5. For example, the cross section taken along lines L-L can be generally similar in structure and function as the passage portion 501d shown in FIG. 6.

In operation, the heated working fluid (represented by arrow 703a) enters the second heat exchanging portion 320 through the second inlet port 702a. The inlet header 324a distributes the working fluid to the passage portions 704. The working fluid (represented by arrow 703b) flows across the passage portions 704 to the second outlet header 324b. As the working fluid flows through the passage portions 704, cooling air flows through the fins 706 and past the passage portions 704. The cooling air absorbs heat from the working fluid as the working fluid flows across the passage portions 704. The second outlet header 324b then collects and discharges the working fluid (represented by arrow 703c) from the second outlet port 702b to the reservoir 314.

One advantage associated with embodiment of the second heat exchanging portion 320 described above with reference to FIG. 7 is the ability to substantially equalize cooling air temperatures in at least two directions (e.g., both a lengthwise direction L and a width-wise direction W). For example, in one embodiment, the working fluid flowing through the passage portions 704 is a partially vaporized, two-phase refrigerant. As a result, the working fluid has an at least approximate constant temperature across the length L and the width W. As described above, the heat flux is proportional to the temperature differential ($\Delta T$) between the cooling air and the working fluid. Thus, streams of cooling air with lower incoming temperatures would have greater temperature differentials relative to the working fluid than others with higher incoming temperatures. As a result, the streams with lower incoming temperatures can absorb more heat from the working fluid than others with higher incoming temperatures, thereby resulting in a more equalized temperature profile of the cooling air across the length L and width W after flowing past the second heat exchanging portion 320.

From the foregoing, it will be appreciated that specific embodiments of the invention have been described herein for purposes of illustration, but that various modifications may be made without deviating from the spirit and scope of the invention. For example, although the fluid mover circulates the working fluid in the illustrated embodiments, in other embodiments, the fluid mover can be omitted. Instead, the working fluid can be circulated in the cooling system via natural convection. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited, except as by the appended claims.

I claim:

1. A computer system, comprising:
   a first computer module;
   a second computer module spaced apart from the first computer module to define a space therebetween;
   an electronic device carried by the first computer module; and
   a cooling system positioned in the space between the first and second computer modules, the cooling system including:
   a first heat exchanging portion positioned at least proximate to the electronic device and containing a working fluid that absorbs heat from the electronic device;
   a second heat exchanging portion that receives the heated working fluid from the first heat exchanging portion to cool the heated working fluid; and
   a fluid mover operably coupled to the first and second heat exchanging portions to circulate the working fluid through the first and second heat exchanging portions.

2. The computer system of claim 1 wherein the space between the first and second computer modules defines an air flow path, and wherein the second heat exchanging portion is positioned in the air flow path.

3. The computer system of claim 1 wherein the first computer module has a first end portion spaced apart from a second end portion to define a length L, and wherein the second heat exchanging portion extends at least approximately along the entire length L.

4. The computer system of claim 1 wherein the space between the first and second computer modules defines a cross-sectional area, and wherein the second heat exchanging portion at least approximately fills the cross-sectional area.

5. The computer system of claim 1 wherein the first computer module has a first end portion spaced apart from a second end portion to define a length L, wherein the space between the first and second computer modules defines a width W, and wherein the second heat exchanging portion has a cross-sectional area that is at least approximately equal to the length L times the width W.

6. The computer system of claim 1, further comprising a cabinet, wherein the first and second computer modules are positioned side-by-side in the cabinet.

7. The computer system of claim 1 wherein the first and second computer modules are positioned side by side and edgewise in the cabinet, and wherein the computer system further includes a first air cooler positioned adjacent to first edges of the first and second computer modules and a second air cooler positioned adjacent to second edges of the first and second computer modules.

8. The computer system of claim 1 wherein the first heat exchanging portion includes a plurality of fluid passages.

9. The computer system of claim 1 wherein the first heat exchanging portion is positioned between the second heat exchanging portion and the electronic device.

10. The computer system of claim 1 wherein at least a portion of the first heat exchanging portion contacts at least a portion of the electronic device.

11. The computer system of claim 1 wherein the second heat exchanging portion includes at least a first fluid passage spaced apart from a second fluid passage to define an air flow passage therebetween.

12. The computer system of claim 1 wherein the fluid mover includes a pump.

13. The computer system of claim 1 further comprising an air mover positioned in the computer cabinet, and wherein the first heat exchanging portion includes a plurality of fluid passages and is positioned between the second heat exchanging portion and the electronic device, at least a portion of the first heat exchanging portion contacting at least a portion of the electronic device, and wherein the first computer module has a first end portion spaced apart from a second end portion to define a length L, wherein the space between the first and second computer modules defines a width W, and wherein the second heat exchanging portion has a cross-sectional area that is at least approximately equal to the length L times the width W.

14. A computer module assembly comprising:
   a substrate;
   an electronic device mounted to the substrate; and
   a cooling system mounted to the substrate, the cooling system including:
   a first heat exchanging portion positioned at least proximate to the electronic device and containing a working fluid that absorbs heat from the electronic device;
   a second heat exchanging portion positioned at least proximate to the first heat exchanging portion, wherein the second heat exchanging portion receives the heated working fluid from the first heat exchanging portion to cool the heated working fluid in an air flow path; and
   a fluid mover operably coupled to at least one of the first and second heat exchanging portions to circulate the working fluid through at least one of the first and second heat exchanging portions.

15. The computer module assembly of claim 14 wherein the substrate has a first end portion spaced apart from a second end portion to define a length L, and wherein the second heat exchanging portion extends at least approximately along the entire length L.

16. The computer module assembly of claim 15 wherein the computer module assembly is a first computer module assembly, and wherein the cabinet further includes a second computer module assembly spaced apart from the first module assembly to define a width W therebetween, and wherein the second heat exchanging portion extends at least approximately along the entire length L and across at least approximately the entire width W.

17. The computer module assembly of claim 14 wherein the computer module assembly is a first computer module assembly, and wherein the cabinet further includes a second computer module assembly spaced apart from the first module assembly to define a cross-sectional area of the air flow path, and wherein the second heat exchanging portion substantially fills the cross-sectional area.

18. The computer module assembly of claim 14 wherein the first heat exchanging portion includes a plurality of fluid passages in a generally parallel arrangement.

19. The computer module assembly of claim 14 wherein the first heat exchanging portion includes a plurality of fluid-carrying micro-channels.

20. The computer module assembly of claim 14 wherein the second heat exchanging portion includes a plurality of fins separating a plurality of corresponding fluid passages.

21. The computer module assembly of claim 20 wherein the plurality of fins include corrugated fins defining adjacent fluid micro-channels.

22. The computer module assembly of claim 14 wherein the first heat exchanging portion includes a plurality of fluid-carrying micro-channels, wherein the computer module assembly is a first computer module assembly, and wherein the cabinet further includes a second computer module assembly spaced apart from the first module assembly to define a width W therebetween, and wherein the second heat exchanging portion includes a plurality of fins separating a plurality of corresponding fluid passages and extends at least approximately along the entire length L and across at least approximately the entire width W.

23. A method for cooling an electronic device mounted to a first computer module in a cabinet, the method comprising:
   positioning a first heat exchanger at least proximate to the electronic device;
   positioning a second heat exchanger at least proximate to the first heat exchanger;
   moving a working fluid through the first heat exchanger to absorb heat from the electronic device;
   moving the heated working fluid from the first heat exchanger to the second heat exchanger; and
   flowing air past the second heat exchanger to cool the heated working fluid.

24. The method of claim 23 wherein the cabinet further holds a second computer module spaced apart from the first computer module to define a space therebetween, and wherein the second heat exchanger is positioned in the space between the first and second computer modules.

25. The method of claim 23 wherein positioning a first heat exchanger at least proximate to the electronic device includes contacting at least a portion of the first heat exchanger with at least a portion of the electronic device.

26. The method of claim 23 wherein positioning a second heat exchanger at least proximate to the first heat exchanger includes sandwiching the first heat exchanger between the second heat exchanger and the electronic device.

27. The method of claim 23 wherein positioning a first heat exchanger at least proximate to the electronic device includes attaching the first heat exchanger to the first computer module, and wherein positioning a second heat exchanger at least proximate to the first heat exchanger includes attaching the second heat exchanger to the first computer module.

28. The method of claim 23 wherein moving a working fluid includes moving a two-phase refrigerant.

29. The method of claim 23 wherein flowing air past the second heat exchanger to cool the heated working fluid includes flowing air past the second heat exchanger to substantially condense the working fluid.

30. The method of claim 23 wherein moving a working fluid through the first heat exchanger to absorb heat from the electronic device includes moving a working fluid through the first heat exchanger to absorb heat from the electronic device by forced-convection.

31. The method of claim 23 wherein the cabinet further includes an air cooler positioned adjacent to the first computer module, wherein the method further comprises flowing the air past the air cooler before flowing the air past the second heat exchanger.

32. A method for equalizing a temperature profile in a computer cabinet, the computer cabinet holding a plurality of computer modules carrying corresponding electronic devices, wherein at least two adjacent computer modules are spaced apart from each other to define an air flow path therebetween, the method comprising:
   positioning a first heat exchanger proximate to at least one of the electronic devices;
   positioning a second heat exchanger in the air flow path;
   at least partially vaporizing a working fluid in the first heat exchanger by absorbing heat from the at least one electronic device;
   moving the partially vaporized working fluid from the first heat exchanger to the second heat exchanger;
   flowing a first stream of air having a first air temperature along a first portion of the air flow path between the two adjacent modules;
   flowing a second stream of air having a second air temperature along a second portion of the air flow path between the two adjacent modules, the first air temperature being lower than the second air temperature; and
   transferring more heat from the partially vaporized working fluid to the first stream of air than to the second stream of air.

33. The method of claim 32 wherein the air flow path has a length L, and wherein positioning a second heat exchanger in the air flow path includes positioning a second heat exchanger that extends at least approximately along the entire length L in the air flow path.

34. The method of claim 32 wherein the air flow path has a length L and a width W, and wherein positioning a second heat exchanger in the air flow path includes positioning a second heat exchanger that extends at least approximately along the entire length L and the entire width W in the air flow path.

35. The method of claim 32 wherein at least partially vaporizing a working fluid in the first heat exchanger includes at least partially vaporizing a refrigerant in the first heat exchanger.

36. The method of claim 32 wherein the cabinet further includes an air cooler positioned adjacent to the computer modules, and wherein the method further includes cooling the heated first and second streams of air by flowing the first and second streams of air past the air cooler.

37. A system for cooling an electronic device mounted on a computer module in a computer cabinet, the system comprising:
   means for removing heat from the electronic device to a working fluid;
   means for moving a flow of air through the computer cabinet and past the computer module; and
   means for substantially equalizing a temperature of the air by exchanging heat between the heated working fluid and the flow of air past the computer module.

38. The system of claim 37 wherein the means for substantially equalizing a temperature of the air equalizing the temperature of the air in two directions that are substantially perpendicular to each other.

39. The method of claim 37, further comprising means for circulating the working fluid from the means for removing heat from the electronic device to the means for substantially equalizing a temperature of the air.

40. The method of claim 37 wherein the computer module has a first end portion spaced apart from a second end portion to define a length L, and wherein the means for substantially equalizing the temperature of the air extends along substantially the entire length L.

* * * * *

UNITED STATES PATENT AND TRADEMARK OFFICE
CERTIFICATE OF CORRECTION

PATENT NO. : 7,411,785 B2  Page 1 of 1
APPLICATION NO. : 11/447469
DATED : August 12, 2008
INVENTOR(S) : Doll It is certified that error appears in the above-identified patent and that said Letters Patent is hereby corrected as shown below:

Title Pg, Item (56)
On page 2, under "Other Publications", in column 2, line 34, delete "May" and insert -- March --, therefor.

In column 9, line 6, delete "FIGS." and insert -- FIG. --, therefor.

Signed and Sealed this

Twenty-first Day of October, 2008

JON W. DUDAS
*Director of the United States Patent and Trademark Office*